Figure 21:
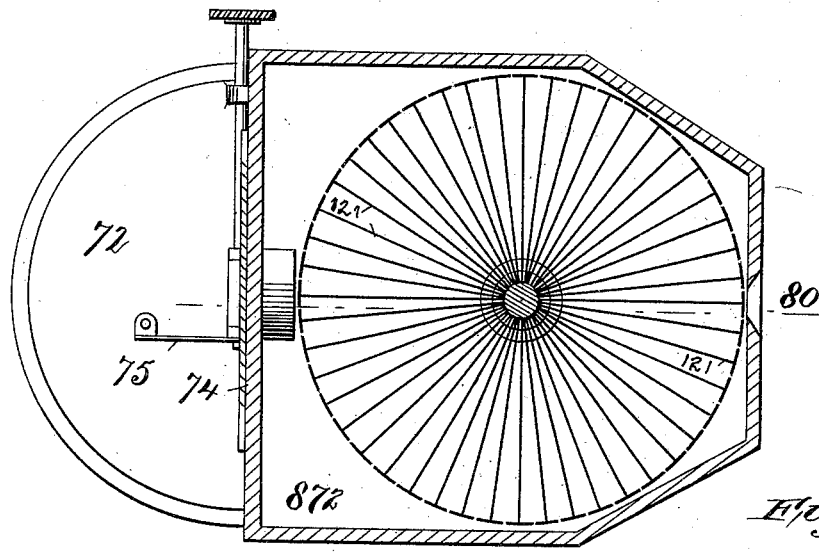

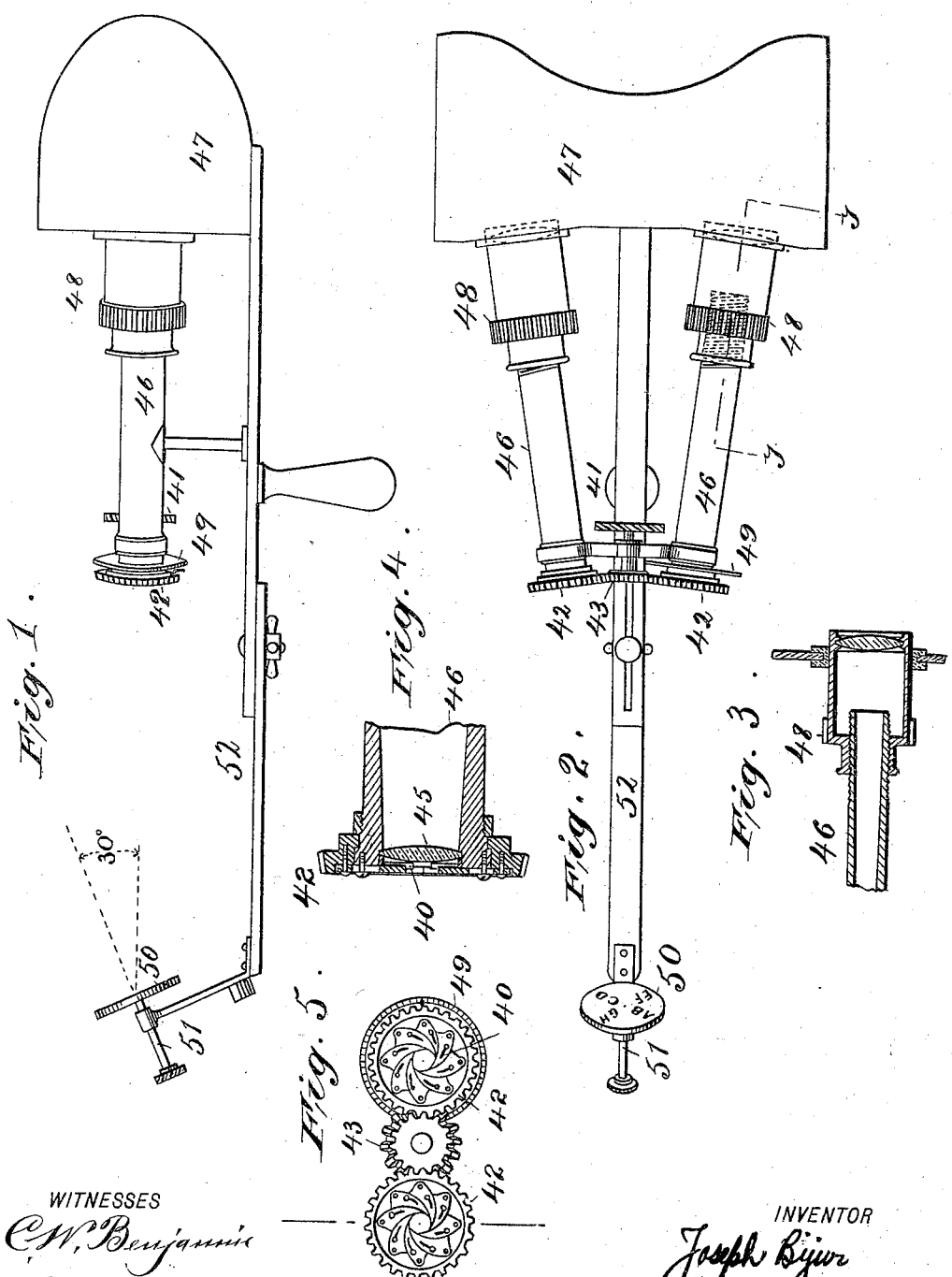

No. 643,184. Patented Feb. 13, 1900.
J. BIJUR.
APPARATUS FOR MEASURING AND COMPARING ILLUMINATION.
(Application filed Apr. 3, 1899.)
(No Model.) 8 Sheets—Sheet 2.
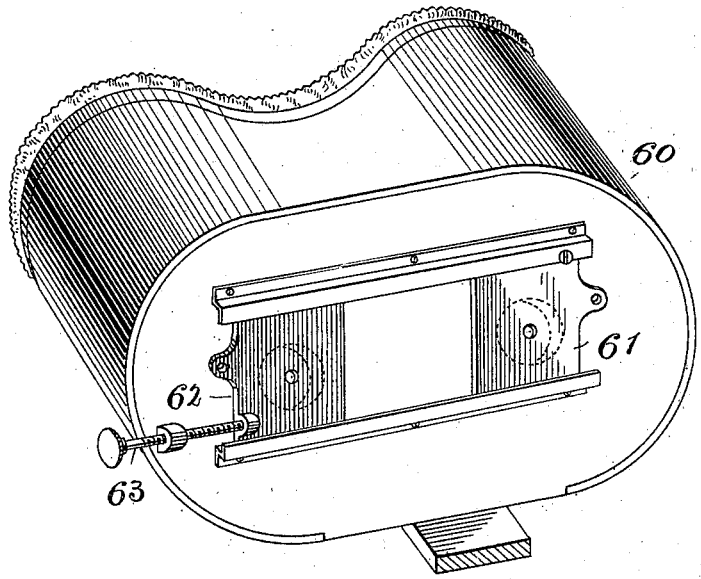
Fig. 6.
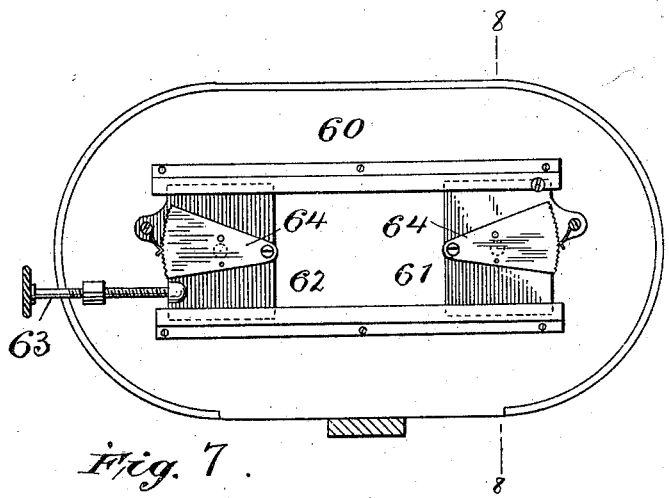 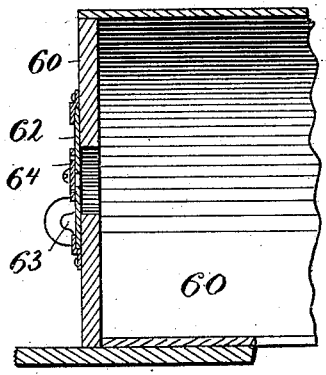
Fig. 7. Fig. 8.
WITNESSES
C. W. Benjamin
Chas. G. Hensley
INVENTOR
Joseph Bijur
BY
ATTORNEY No. 643,184. Patented Feb. 13, 1900.
J. BIJUR.
APPARATUS FOR MEASURING AND COMPARING ILLUMINATION.
(Application filed Apr. 3, 1899.)
(No Model.) 8 Sheets—Sheet 3.
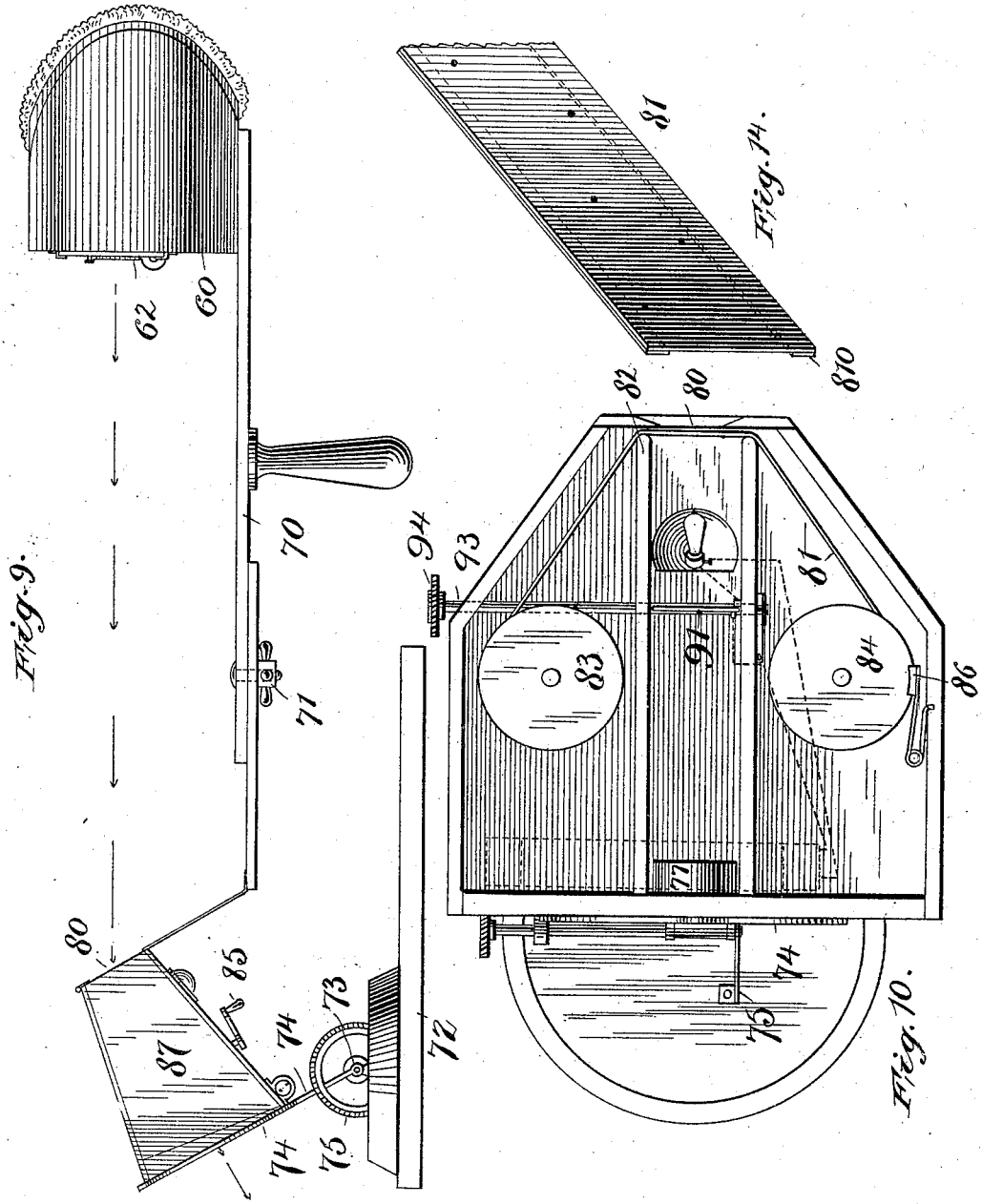
WITNESSES
INVENTOR
Joseph Bijur
BY
ATTORNEY No. 643,184. Patented Feb. 13, 1900.
J. BIJUR.
APPARATUS FOR MEASURING AND COMPARING ILLUMINATION.
(Application filed Apr. 3, 1899.)
(No Model.) 8 Sheets—Sheet 4.
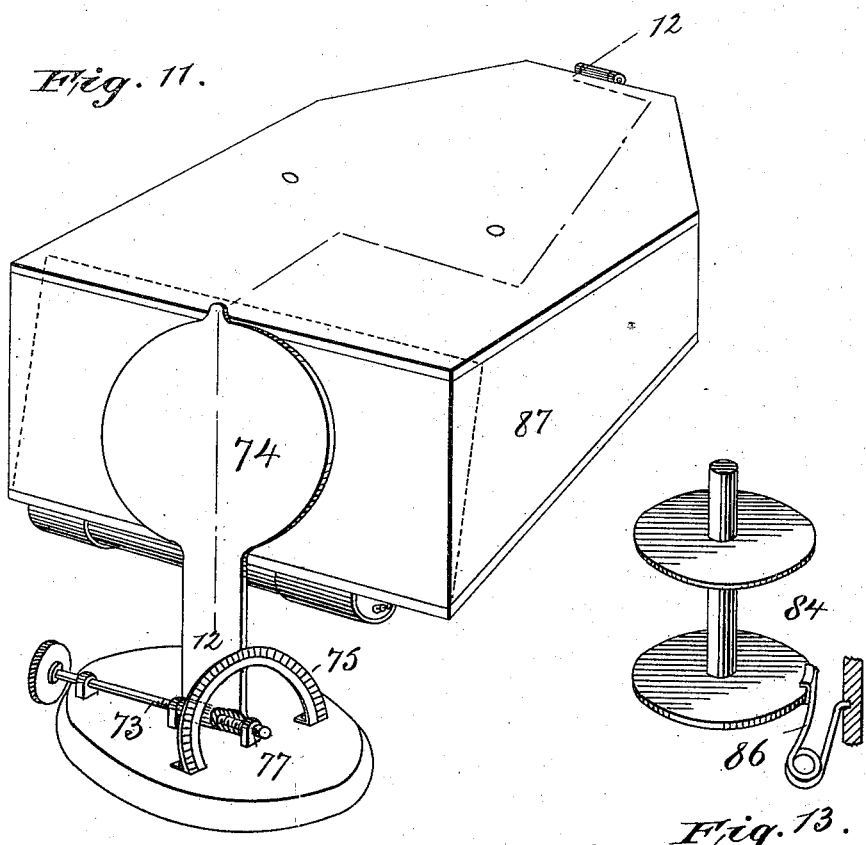
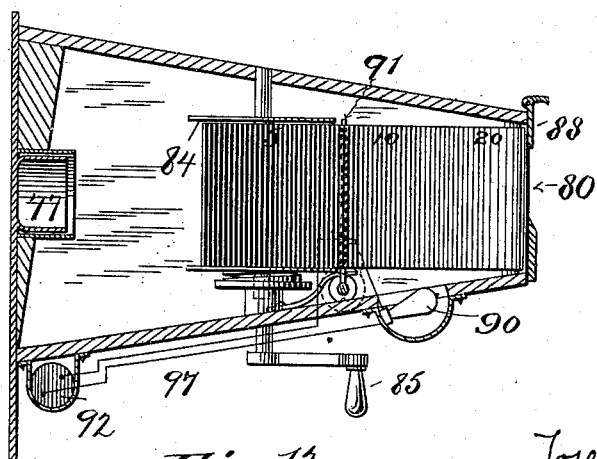
WITNESSES
C. W. Benjamin
Chas. G. Hensley
INVENTOR
Joseph Bijur
BY
ATTORNEY No. 643,184. Patented Feb. 13, 1900.
J. BIJUR.
APPARATUS FOR MEASURING AND COMPARING ILLUMINATION.
(Application filed Apr. 3, 1899.)
(No Model.) 8 Sheets—Sheet 5.
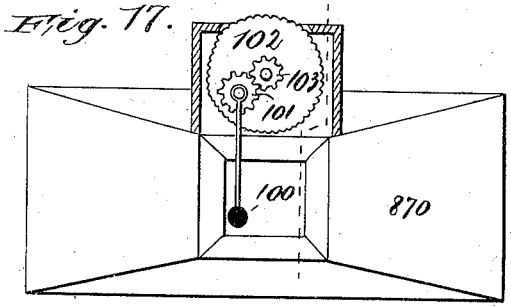
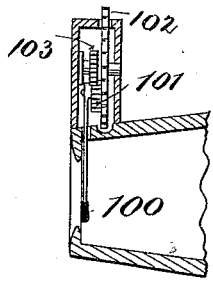
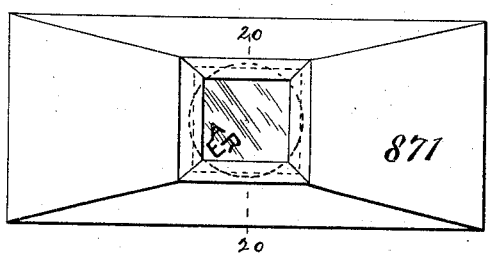
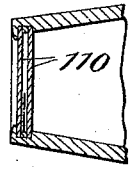
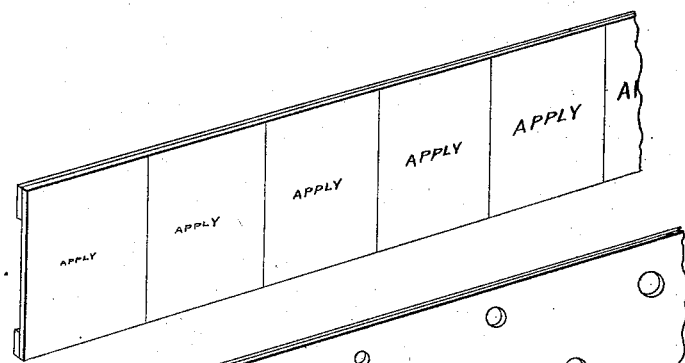
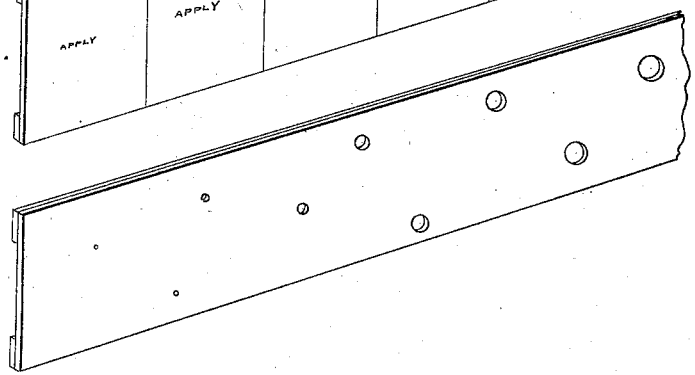

No. 643,184. Patented Feb. 13, 1900.
J. BIJUR.
APPARATUS FOR MEASURING AND COMPARING ILLUMINATION.
(Application filed Apr. 3, 1899.)
(No Model.) 8 Sheets—Sheet 6.

WITNESSES
C. W. Benjamin
Chas. G. Hensley

INVENTOR
Joseph Bijur
BY
Harold D… 
ATTORNEY

No. 643,184. Patented Feb. 13, 1900.
J. BIJUR.
APPARATUS FOR MEASURING AND COMPARING ILLUMINATION.
(Application filed Apr. 3, 1899.)
(No Model.) 8 Sheets—Sheet 7.
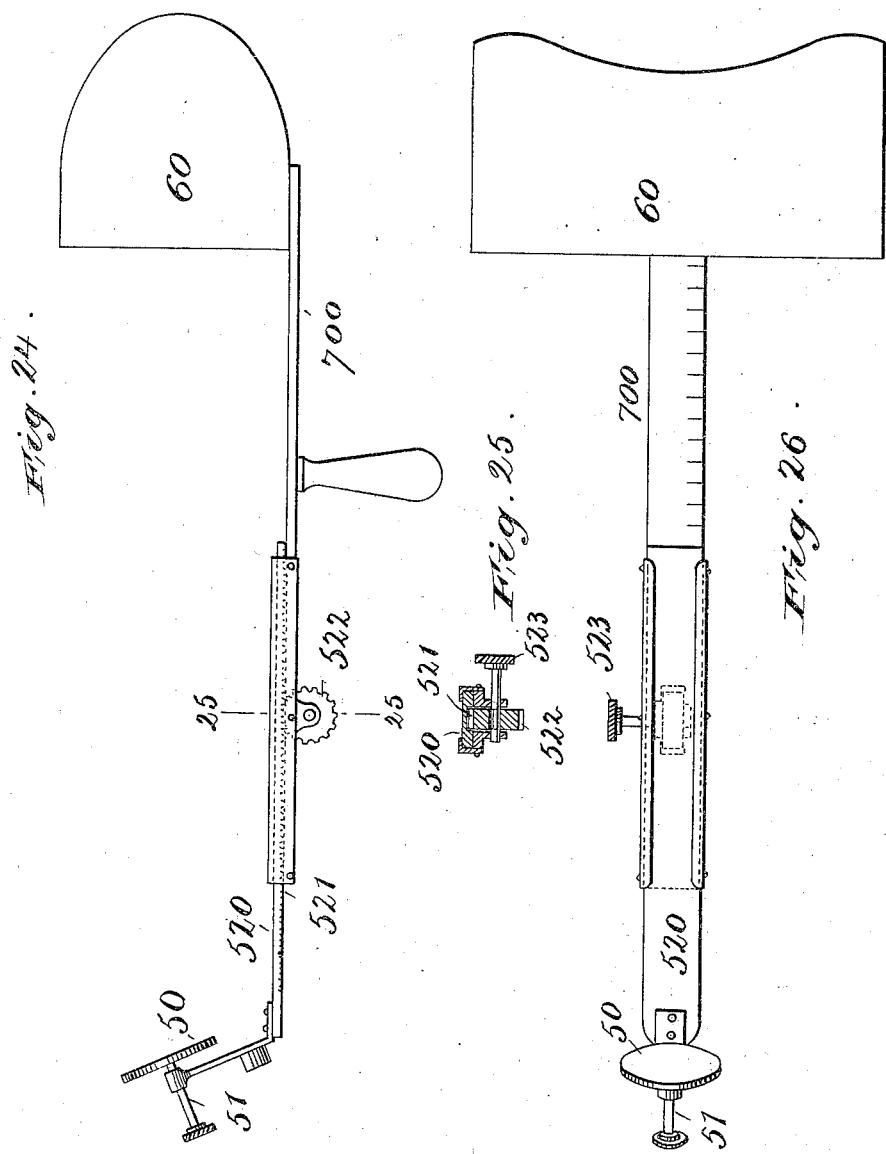
WITNESSES
C. W. Benjamin
Chas. G. Hensley
INVENTOR
Joseph Bijur
BY Harold B. Amey
ATTORNEY

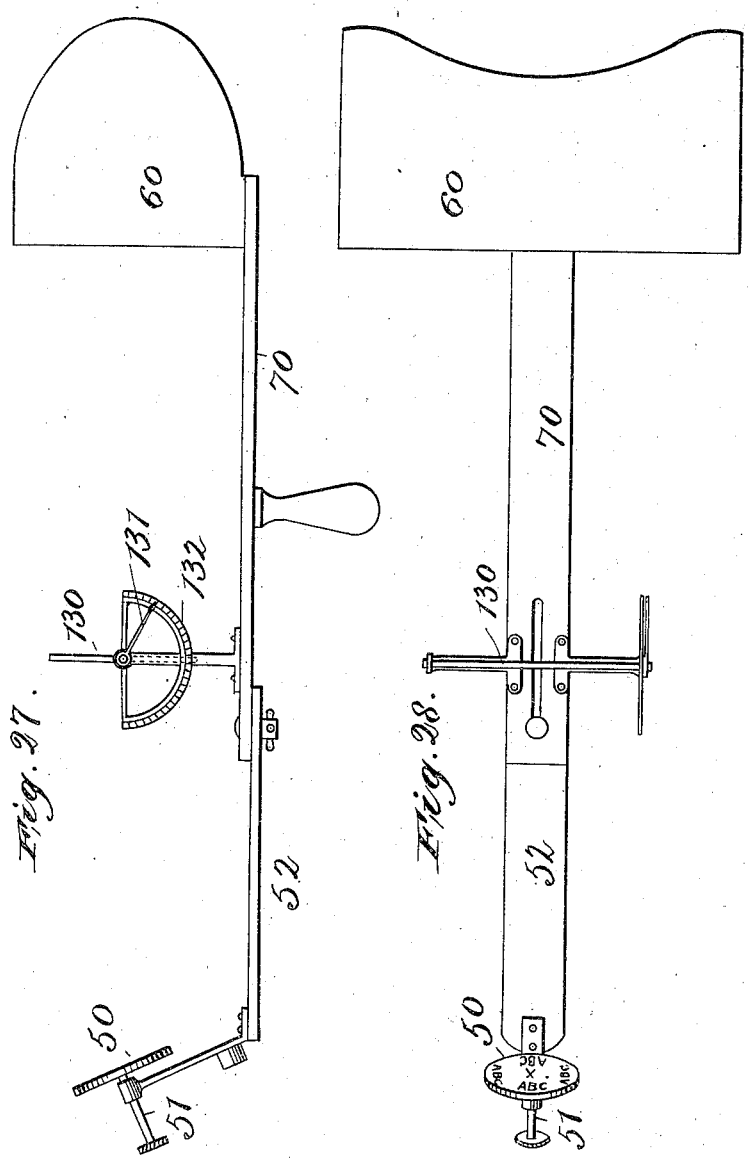

UNITED STATES PATENT OFFICE.

JOSEPH BIJUR, OF NEW YORK, N. Y.

APPARATUS FOR MEASURING AND COMPARING ILLUMINATION.

SPECIFICATION forming part of Letters Patent No. 643,184, dated February 13, 1900.

Application filed April 3, 1899. Serial No. 711,526. (No model.)

*To all whom it may concern:*

Be it known that I, JOSEPH BIJUR, an American citizen, residing at New York, in the State of New York, have invented certain new and useful Improvements in Apparatus for Measuring and Comparing Illumination, of which the following is a description, referring to the accompanying drawings, which form a part of this specification.

The object of the invention is the convenient and accurate measurement of the illumination received at a given point and also the production of simple apparatus for making the measurement.

The brightness upon the retina of the image of an illuminated test object or test surface will, other things being constant, vary as the area of the pupil of the eye. If seen through a lens or a system of lenses, it will vary as the area of the opening of an interposed diaphragm. If a diaphragm smaller than the pupil of the eye be placed directly in front of the eye, the brightness of the image will vary as the area of the diaphragm. Moreover, the iris or the pupil of the eye will be powerless to vitiate or disturb the observation; also, the brightness of the image will vary as the illumination falling on the test object if the other conditions are constant; but the eye furnishes no accurate means of estimating the relative brightness of different images it may receive. As, however, the limit of perceptibility of a given test object by the eye varies comparatively little in the normal eye under proper precautions, I make the limit of perceptibility my constant condition for comparing different illuminations with each other and with any standard of illumination adopted. For a constant brightness of image the area of the diaphragm varies inversely as the illumination which the test object receives. By decreasing the area of the diaphragm until the illuminated test object is barely discernible I am therefore able to accurately compare one illumination with another by measuring the areas of the diaphragm in each case. Consequently, also, by adopting a standard of illumination—for instance, that falling on the test object by a standard candle at a distance of one meter—and calibrating an adjustable diaphragm or a set of diaphragms inversely as the area of the openings I am able to measure illuminations by direct reading; also, I may use a range of test objects of different determined light-reflecting characters or perceptibility in order to vary the brightness of the image. Suppose, for example, I view a dark opening or hole in a white ground, the space behind the opening being the dark interior of a chamber or box and giving a substantially true black. Under certain conditions of illumination and area of diaphragm such a test object will be barely discernible. I may then substitute a neutral gray ground, with a hole of the same size as before, and ascertain that it is barely discernible when exposed to a known illumination $n$ (for example, ten) times as great or when exposed to the same illumination with the area of diaphragm-opening $n$ (for example, ten) times as great. I then know that illuminations measured by means of that test object must be multiplied by the constant $n$ (for example, ten) in comparing with measurements made with the white ground. I am able by my method of measurement to produce a series or range of test objects of known proportions to the standard one adopted, and having done so I may utilize these in place of an adjustable diaphragm or set of diaphragms in comparing or measuring illuminations. Also the discernibility of a given test object may be decreased or diminished by moving it toward or away from the eye, and in other ways hereinafter mentioned; but however the increase or decrease in discernibility may be produced in carrying out my invention the measurement is based on the principle that if the discernibility is brought to a constant condition determined by the test object being barely discernible, under this condition the illumination is a definite and known function of the diaphragm-opening, of the known reflecting properties of the test object, of the distance from the object to the eye, or of any other means employed to reduce the brightness of the image in the eye.

As a result of my method of measuring illuminations differently-colored lights or illuminations may be compared as accurately as white light, for the illumination may fall upon the test object unimpeded and unaffected in any way, and the limit of discernibility furnishes as definite a measure for colored as for white light. My method does not, therefore, present the difficulty, if not impossibility, of estimating the relative brightness or equality of two different colors seen simultaneously. On the contrary, the eye perceives only an object of black, white, or neutral tint or shade rendered barely perceptible. The range of means capable of carrying out my process is very large.

In the drawings I illustrate a few forms.

Figure 22:
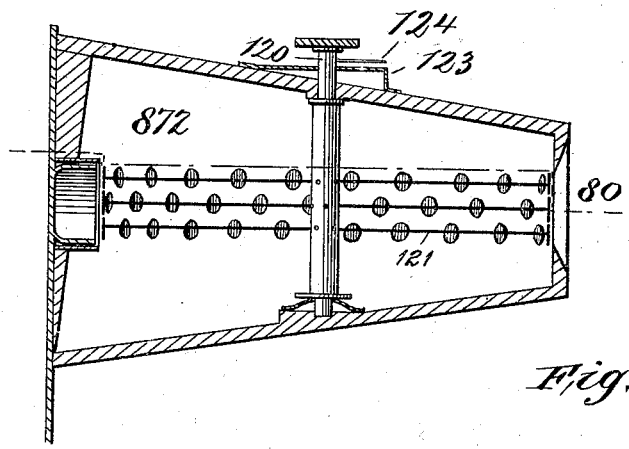
Figure 23:
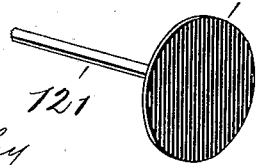

Figure 1 is a side elevation of one form of my invention. Fig. 2 is a plan thereof. Figs. 3, 4, and 5 are details. Figs. 6, 7, and 8 show a modification in certain details. Fig. 9 shows a complete instrument embodying the invention in modified form. Fig. 10 is a detail view of a portion of Fig. 9 with the cover or top removed. Fig. 11 is an isometric view of the chamber of box of Fig. 9 and its attachments. Fig. 12 is an interior view thereof. Fig. 13 is a detail. Fig. 14 is a modification of the illuminated object or surface of the instrument. Figs. 15 and 16 are other modifications of the same. Figs. 17 and 18 are face view and cross-section of a modified form of the box or chamber apparatus. Figs. 19 and 20 show another modification. Figs. 21, 22, and 23 are plan view, partly in section, side elevation, partly in section, and a detail of a modified form of box or chamber apparatus. Fig. 24 is a modified form of the whole instrument; Fig. 25, a cross-section on the plane 25 of Fig. 24, and Fig. 26 is a plan view of the same. Figs. 27 and 28 show another modification, side elevation and plan.

Throughout the drawings like reference-figures refer to like parts.

In the form shown in Figs. 1 to 5 the measurement is obtained by adjusting diaphragms 40 by means of thumb-wheel 41 and gears 42 and 43 until the object or disk 50, the illumination of which is to be measured, is only just discernible to the observer. The adjustable diaphragms 40 are located in front of the lenses 45, which are the objectives in the two binocular tubes 46, provided with a hood 47 for shielding the eyes of the observer from light. The focus may be adjusted in any suitable manner—such, for instance, as by the milled adjusting-rings 48—as will be well understood. The adjustment of the diaphragms may be read directly upon the disk 49 by means of the index-finger. (Shown in Fig. 1.) The disk 50 may be of any desired shape, and several interchangeable disks may be used, of different shades and showing different objects or characters. The disk is pivotally mounted by means of the shaft 51, which may be twirled to cause the disk to spin and come to rest at any accidental position. When the diaphragms are closed until the characters on the disk are only just discernible, the reading is taken on the disk 49, and the illumination relatively to a standard becomes merely a matter of figuring, or, if the disk 49 is suitably calibrated, merely a matter of direct reading on the disk.

Figs. 6 to 13 show a modification in which no lenses are employed. The hood 60 is provided with two diaphragm-plates 61 62, relatively adjustable by means of a screw-threaded rod 63 to adapt them exactly to the distance between the pupils of the observer's eyes. Pivoted slides 64, having smaller holes than the holes in the diaphragms 61 62, are arranged to be interposed so that the holes may be placed at will centrally over the holes in the diaphragms. The holes in the slides 64 are preferably some convenient fraction in diameter or area of the holes in the diaphragms. In this way it is possible to reduce the light passing through the diaphragm to one one-hundredth or to one ten-thousandth or to other convenient fractions of its original amount, thus enabling the observer to make accurate comparison between illuminations of enormously-different intensity. The hood 60, mounted on the adjustable frame 70, is adjustable to and from the objective point or surface 80 and may be secured when so adjusted by means of the nut and screw 71. The slot in which the bolt or screw slides is similar to that shown in Fig. 2. The objects to be observed consist in this form of the invention of a roll of paper or other suitable material 81, passing over guides 82 and wound at one end upon a spring-reel 83 and at its other end upon a hand-reel 84, operated by a crank 85 and held against the action of the spring-reel by a spring-brake 86. These reels and the paper or material 81 are inclosed within a box or chamber 87. At the forward end of the box, at the point 80, a small section of the surface of the paper or strip 81 is exposed, as shown. Along one edge of the paper or strip there should be some indication, by numeral or otherwise, of the exact shade of the paper or other material at that point, for the shade of the paper or other material of which the strip is composed is graduated throughout the length of the strip from white to nearly black. By "nearly black" I mean to imply that the black ink or pigment is not true black, because it reflects some light. Upon the surface of the strip may be black spots or holes irregularly located, as indicated in Figs. 14 and 15. Furthermore, these holes or spots may be of graduated sizes, as indicated in Fig. 15. In fact, the invention lends itself to an almost innumerable number of modifications. In order that the surface of the strip 81 may not be rubbed or injured by being wound upon the drums or reels, I provide reinforcements 810 along the edges, which serve at once to strengthen the strip and to keep it slightly separated, so that its surface cannot be rubbed or injured. In order to conceal the numerical or other index of the shade of the strip, I provide the hinge-flap 88, which, as shown in Fig. 12, normally conceals the edge of the strip. An electric light 90, mounted within the chamber 87, illuminates a pivoted screen 91 when the screen is in the position shown in Figs. 10 and 12, enabling the observer to see the screen through the holes in the strip 81. When, however, the screen 91 is turned down against the wall of the chamber, it disconnects the circuit 97 of the battery 92, and consequently extinguishes the lamp 90. To accomplish this, I show the stem 93, which is turned by the finger-wheel 94 and which carries the screen 91, and one member of an electric switch included in the circuit 97. The chamber 87 is fitted to and detachably mounted on a plate 74, which turns upon the shaft 73, mounted on the base 72. A scale of angles 75, calibrated in degrees or otherwise, and the shaft 73 enable the plate 74 to be set at any desired angle and to be held at such angle. To secure the latter effect, the shaft 73 may be screw-threaded through the bearing 77, and therefore by drawing the bearing 77 frictionally against the edge of the plate 74 it may hold the plate 74 from turning. On the upper side of the plate 74 and projecting through into the chamber 87 is a hollow cylinder 77.

The form of construction of these several features of my device will be best understood from the accompanying drawings and the following description of their use and operation:

Supposing it is desired to measure the illumination at a given point, such as the top of a desk, in a room or office, the base 72 is set on the desk with the hollow cylinder 77 turned toward the window or other source of light, but with the chamber 87 and connected parts removed. The plate 74 is then turned until the cylinder 77 either casts no shadow at all or an even shadow all around it. When so adjusted, the line of maximum illumination is of course perpendicular to the plate 74. The screw-shaft 73 is then turned to secure the plate 74 in fixed position, and the chamber 87 is then put in place with its connected hood 60, as shown in Fig. 9. When so placed, the light is of course received perpendicularly upon the exposed surface 80 of the strip 81. The observer then looks through the diaphragms 61 62 and adjusts the strip until the black spots or holes upon it are scarcely discernible against their background. When the illumination is good, the smallest hole in the pivoted slide 64 will be used on the diaphragms. When the illumination is very poor, the larger holes will be used. When the strip has been adjusted until the holes or spots are scarcely discernible, the observation is completed, and the measurement is made by reading the index on the edge of the strip 81, and by knowing the size of the hole in the diaphragm or in the slide 64 it will be understood that the contraction of the iris of the observer or its undue expansion can have no effect upon the observation, inasmuch as the diaphragm interposed in front of the pupil of each eye has an opening considerably smaller than the size of the pupil.

I do not attempt to show the many modifications which may be devised for the objects or surface to be observed. I believe, however, that the best possible black is that produced by looking through a small hole into the dark closed chamber 87. The contrast between such a black as seen through a small hole in the strip 81 and the blackest ink or pigment possible upon the strip 81 is scarcely discernible in strong illumination through a small hole in the diaphragms or slides 61 62 64. Nevertheless I show two modifications of the strip—viz., in Fig. 15 the use of holes of varying size and in Fig. 16 letters or characters of varying size.

In Fig. 17 a modification is shown in face view and in Fig. 18 in section, wherein a small disk is movable in front of the background formed by a paper strip of graded shade without perforations in the chamber 870. In order that the position of the small disk 100 may not be known to the observer, I prefer to pivotally secure it to the shaft of a planet-wheel 101, mounted on a disk 102 and meshing with a stationary gear 103. The disk 102 may be turned by hand, carrying the planet-wheel 101 around the wheel 103. The disk 100, hanging loosely like a pendulum from the pin or shaft of the wheel 101, will be raised and lowered and swung from side to side irregularly under the effect of friction at the shaft of the wheel 101, so that the observer can never tell in advance where he may expect to see the disk 100. The disk 100 should be black, so as to contrast but slightly with the background against which it is seen.

In Figs. 19 and 20 I show a modification in which small loose objects, such as letters, are inclosed in a circular cell formed by two transparent plates 110 in front of the chamber 871. Before each observation the cell is turned by the finger, so that the loose letters or objects assume irregular positions unknown to the observer.

In Figs. 21, 22, and 23 a chamber 872, similar to the chamber 87, carries with it a rotary shaft 120, upon which are mounted three series of slim radial rods 121, carrying disks 122 of different shades. One or more of these disks is always exposed at the opening 80 of the box and is viewed against the dark interior of the box or chamber 872. The observation is made by turning the shaft 120, so as to cause the disks to pass by the opening until a disk in one of the three rows at a previously-unknown position is distinguishable from the dark background. The illumination is then calculated by reading the index 123 under the needle 124, which, in conjunction with the size of the hole in the diaphragm or slide in front of the pupil of the eye, will determine the illumination in terms of the standard adopted.

Figs. 24, 25, and 26 show a simplification of the invention for use where the range of illumination is not very great, though this form is capable of use for great range of illumination by means of several interchangeable objects or disks 50 and changeable diaphragms, as already described. In this form the adjustment for increasing or lessening the light which is received by the observer's eye consists in moving the disk 50 and its attached frame member 520 toward or from the hood 60. The member 520 slides upon the member 700 of the frame, and one of these two members has a scale suitably calibrated. The sliding adjustment of the member 520 is secured by rack-teeth 521 and pinion 522, turned by a thumb-wheel 523.

In Figs. 27 and 28 a modification is shown in which a transparent glass or other plate 130 is pivotally mounted between the disk 50 and the hood 60. The plate 130 can be turned on its horizontal axis, and its index-finger 131 will indicate upon the scale 132 its adjustment. When the plate 130 is perpendicular to the line of vision, it will reflect and therefore cut off a certain fraction of the light which the disk 50 transmits toward the eye of the observer. When, however, the plate 130 is turned considerably to the line of vision, a very large fraction of the light-rays from the disk are reflected, making it correspondingly difficult to discern the figures or objects upon the disk 50.

Having now described several embodiments of my improvement, I will summarize the characteristic features of the invention.

First. It will be seen that I measure the illumination relative to some standard—such, for instance, as the illumination produced by a candle-power at a distance of one meter upon a selected surface—such, for instance, as white porcelain or even white paper. I make the comparison by exposing an object or surface at the given point or place perpendicularly to the light, and the observer views such object or surface at a fixed and unchangeable angle, which in the figures of the drawings is thirty degrees from the perpendicular, as shown in Fig. 1. Using a black hole or spot on a white background as one standard for comparison, I may arbitrarily adopt other standards or I may prepare others in a fixed light-reflecting proportion to the one standard adopted. To illustrate, I may adopt several different neutral grays, some nearly white and some nearly black, or I may construct backgrounds which will reflect exactly one-hundredth part or other part of the light which the standard white surface reflects. By the use of such different backgrounds, or of objects having different shades relatively to the background or of objects having different sizes, I am enabled to reflect to the eye of the observer only a determinate fraction (as compared with the selected standard test condition) of the light which constitutes the illumination to be measured. I of course prefer a surface which has the least possible polish, so that the reflection will be diffuse reflection.

Secondly. In the preferred form of my invention in addition to so reflecting only a determinate fraction of the total illumination I further reduce such fraction, or, in other words, reduce the light received by the eye, by various means—such as diaphragms, reflecting-plates, change of distance, &c., as already described—until the test object is scarcely discernible from the background. Having done this, the comparison of one illumination with another or of any illumination with a standard is a mere question of calculation or proper calibration of the instruments and the surfaces or backgrounds employed. It will be seen that the test object or receiving-surface is set normal to the maximum illumination or ray and is always observed at a constant angle, so as to always have present exactly the same conditions of observation. When, however, the illumination falling at a particular angle or on a particular plane is desired that can of course be measured by setting the instrument with the plate 74, or, in other words, the surface of the test object, parallel with the desired plane. Thus, for example, the illumination upon the horizontal plane may be readily measured.

By the use of my invention in any of its preferred forms illuminations of different colors as well as merely different intensities may be measured and compared by the observer, for as the test is made by means of objects of black, white, or neutral shades and by rendering such objects barely discernible and as, moreover, the light falling on the test object is not modified by the interposition of any sanded glass, oil-paper, or other interposed screen, but merely by the possibility of discerning the test object, colored illumination may be measured in exactly the same way as white light. No equalization of the illumination upon two different surfaces or upon two sides of the same surface, as in the Bunsen photometer, is required, nor any estimation of equality between two differently-colored lights. Furthermore, the position of the test object may in my instrument be entirely unknown to the observer until he perceives it in adjusting the instrument from darkness toward perceptibility. He has merely to start with the instrument adjusted to render the test object invisible and then gradually admit more and more light to the eye until he perceives the test object. Sometimes the observer is not certain whether or not he does perceive the test object. In such case he can verify his impression by turning on the electric light, which will show him the colored illuminated screen 91, Figs. 10 and 12, behind the test object and enable him at once to tell whether the position of the test object is what he supposed it to be.

As the result of the principles underlying my invention the instruments can be manufactured anywhere and directly without requiring comparison one with another. A satisfactory standard of black is always obtainable by means of a hole or opening in a relatively large dark chamber. A good standard of white may be obtained by snow or by any chosen white substances, such as barium sulfate in a pure state. Intermediate shades between black and white can be produced and exactly measured by fine black ruling on a white surface with or without cross-ruling or by the mixture of black pigment with white pigment and a subsequent determination of the light-reflecting quality of the surface produced. Neutral tints can also be produced photographically. The comparison of one test object with another or one surface with another may be made by merely varying the linear dimension of any of the conditions of the test—such, for instance, as the diameter of the diaphragm when one is used or the distance of the source of light used for the purpose—and when by making such variation the test object becomes only barely discernible the illumination may be calculated or the light-reflecting qualities of the test object may be calculated by means of the well-known laws of light.

What I claim as the characteristic features of my apparatus are the following:

1. A new instrument for measuring and comparing illuminations, combining a test object, means for observing such test object from a definite position on the illumined side thereof, means for varying the proportion of light reflected from such object toward the eye, and means for cutting off determinate fractions of the reflected light transmitted from the object toward the eye, substantially as set forth.

2. In an instrument for measuring and comparing illumination, the combination of a receiving-surface or test object for the illumination, having predetermined light-reflecting character or quality, which varies in a known manner at different portions of its extent, and means for observing such surface or object at a constant angle thereto and means for adjusting the surface or test object to present different portions to view, substantially as set forth.

3. A new instrument for comparing and measuring illuminations, combining a receiving-surface or test object of determined light-reflecting character, means for observing such surface or object at a determinate angle, and means for reducing the reflected light transmitted from such surface or object toward the observer's eye without affecting the actual illumination which surface or test object receives, substantially as set forth.

4. A new instrument for comparing and measuring illuminations, combining a receiving-surface or test object of determined light-reflecting character, which varies to a known extent at different portions, and means for adjusting the said receiving-surface or test object to present different portions for observation, substantially as set forth.

5. In an instrument for measuring or comparing illuminations, a test object, a regulating device interposed between such test object and the eye for diminishing the light transmitted therefrom to the observer's eye, and means for supporting the said object and the regulating device in fixed relations to each other.

6. In an instrument for measuring or comparing illuminations, an adjustable test object, means for observing the said test object from a relatively-fixed angle and means for determinately adjusting the angular position of the said test object to the maximum illumination or ray.

7. In an instrument for measuring or comparing illuminations, a receiving-surface or test object, and means interposed between such surface or test object and the eye for diaphragming the light reflected from such receiving-surface or test object, for the purposes set forth.

8. In an instrument for measuring or comparing illuminations, a reflecting test object for the illumination to be measured, an eyepiece, and means interposed between the object and the eyepiece for determinately cutting off some of the transmitted light without modifying that which is not cut off, substantially as set forth.

9. In an instrument for measuring or comparing illuminations, a test object of different light-affecting qualities at different portions of its extent, and means for adjusting such test object across the field of view to present different portions for observation, substantially as set forth.

10. In an instrument for measuring or comparing illuminations by a barely-discernible receiving-surface or test object, means for adjusting or moving such receiving-surface or test object to vary its position in the field of view, whereby it may be observed at a previously-unknown position, substantially as set forth.

11. An instrument for measuring or comparing illuminations, provided with a receiving-surface or test object, set to receive the illumination unmodified in quality or direction, and means for measurably varying the amount of light reflected from such surface or object to the eye without varying the actual illumination falling on such surface or object, substantially as and for the purposes set forth.

Signed this 25th day of March, 1899, at New York city, New York.

JOSEPH BIJUR.

Witnesses:
GEORGE H. SONNEBORN,
HAROLD BINNEY.